(12) United States Patent
Hanazaki

(10) Patent No.: US 7,110,483 B1
(45) Date of Patent: Sep. 19, 2006

(54) COMMUNICATION METHOD (75) Inventor: Yasumasa Hanazaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 806 days.

(21) Appl. No.: 10/089,676

(22) PCT Filed: Aug. 4, 2000

(86) PCT No.: PCT/JP00/05258

§ 371 (c)(1),
(2), (4) Date: Apr. 3, 2002

(87) PCT Pub. No.: WO02/13474

PCT Pub. Date: Feb. 14, 2002

(51) Int. Cl.
H04L 7/00 (2006.01)
G06F 11/00 (2006.01)

(52) U.S. Cl. .......................... 375/354; 375/259; 714/12

(58) Field of Classification Search ................ 375/259, 375/354, 369; 714/12
See application file for complete search history.

(56) References Cited

U.S. PATENT DOCUMENTS 4,430,745 A * 2/1984 Betts ........................... 375/377
5,390,199 A * 2/1995 Ajima et al. ................. 714/819

FOREIGN PATENT DOCUMENTS

JP 9-269247 10/1997

\* cited by examiner

*Primary Examiner*—Jay K. Patel
*Assistant Examiner*—David B. Lugo
(74) *Attorney, Agent, or Firm*—Sughrue Mion, PLLC

(57) ABSTRACT

In a first microcomputer, a communication function is provided for outputting a data signal having a transmission period Tr that has a relation of Td<Tp/2 with a data time Td, and it sends various data processed by itself and carried on the data signal to a second microcomputer, where the received data signal is sequentially stored in a memory, and the various data are read by timing pulses for reading and processed.

2 Claims, 8 Drawing Sheets

FOR Td>Tp/2

FOR Td<Tp/2

FIG. 8

COMMUNICATION METHOD

TECHNICAL FIELD

This invention relates to an occupant protecting device equipped with air bags for protecting occupants, for instance, in the event of a crash of vehicles, and related to the communication system between the main ECU (Electronic Control Unit) and the satellite ECU, which are forming the control system of the device

BACKGROUND ART

In the communication system applied to the occupant protecting device for vehicles, a collision is generally detected by the acceleration sensors each provided in the main ECU and the satellite ECUs, and signals are exchanged between the two to process the result of collision determination or temporary data for the crash in the main ECU.

Figure 1:
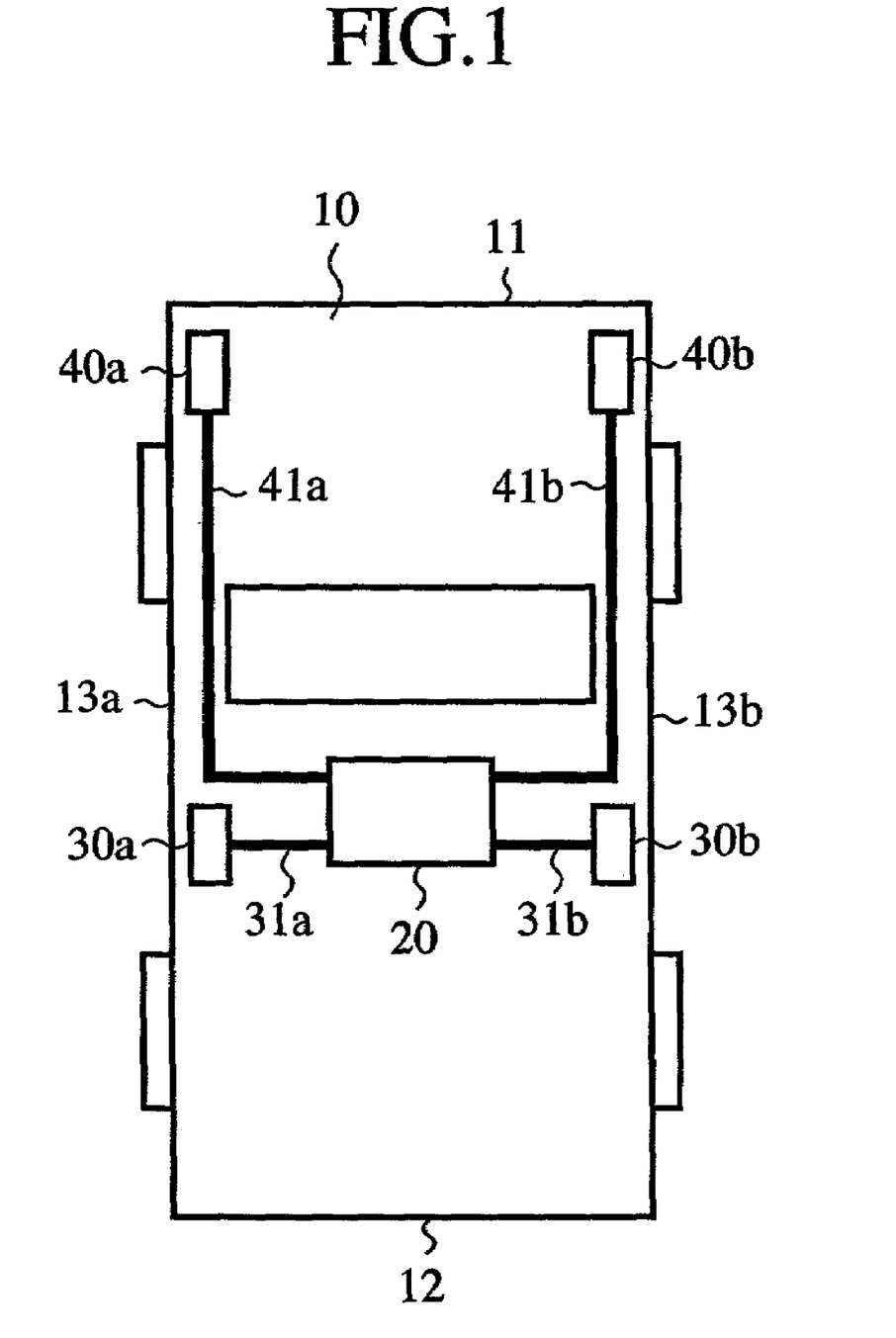
FIG. 1 is a schematic perspective plan view for explaining the positional relation between the main ECU and the satellite ECU.

FIG. 1 is a schematic perspective plan view showing the positional replacement between the main ECU and satellite ECUs on a vehicle. 10 is a vehicle, 11 is the front portion, 12 is the rear portion, and 13a and 13b are the side portions. A main ECU 20 is installed in the central portion of the vehicle 10, and side satellite ECUs 30a and 30b are installed on the side portions 13a and 13b, respectively. Further, at both sides of the front portion 11, there are provided front satellite ECUs 40a and 40b, respectively. The main ECU 20 has a function of detecting a collision occurred at the front side of the vehicle to unfold air bags in front of occupants, particularly the driver and the passenger-side occupant, and a function of receiving collision information from the other satellite ECUs 30a, 30b, 40a, and 40b to unfold the air bags on the side or in front of occupants. The side satellite ECUs 30a and 30b are to detect a side-impact collision by an acceleration sensor, and has a function of determining the accuracy of the collision by its own microcomputer and sending it to the main ECU 20 through communication lines 31a and 31b. Further, the front satellite ECUs 40a and 40b are provided, because an offset collision may not be determined only by the main ECU 20, and they have a function of processing the detection status of the acceleration sensor provided in them by their own microcomputers, and sending the processed data to the main ECU 20 through communication lines 41a and 41b.

Data sent from the satellite ECUs 30a, 30b, 40a, and 40b to the main ECU 20 represent the determination result of collision and the fault diagnosis status of the acceleration sensor under normal conditions. Thus, in the conventional communication system, a trigger signal functioning as a data request command is sent from the main ECU 20 to the satellite ECUs 30a, 30b, 40a, and 40b, and the respective satellite ECUs 30a, 30b, 40a, and 40b transmit a collision determination result or a fault diagnosis result to the main ECU according to the trigger. The main ECU 20 processes and determines the transmitted result, displays a warning or unfolds an air bag.

Figure 2:
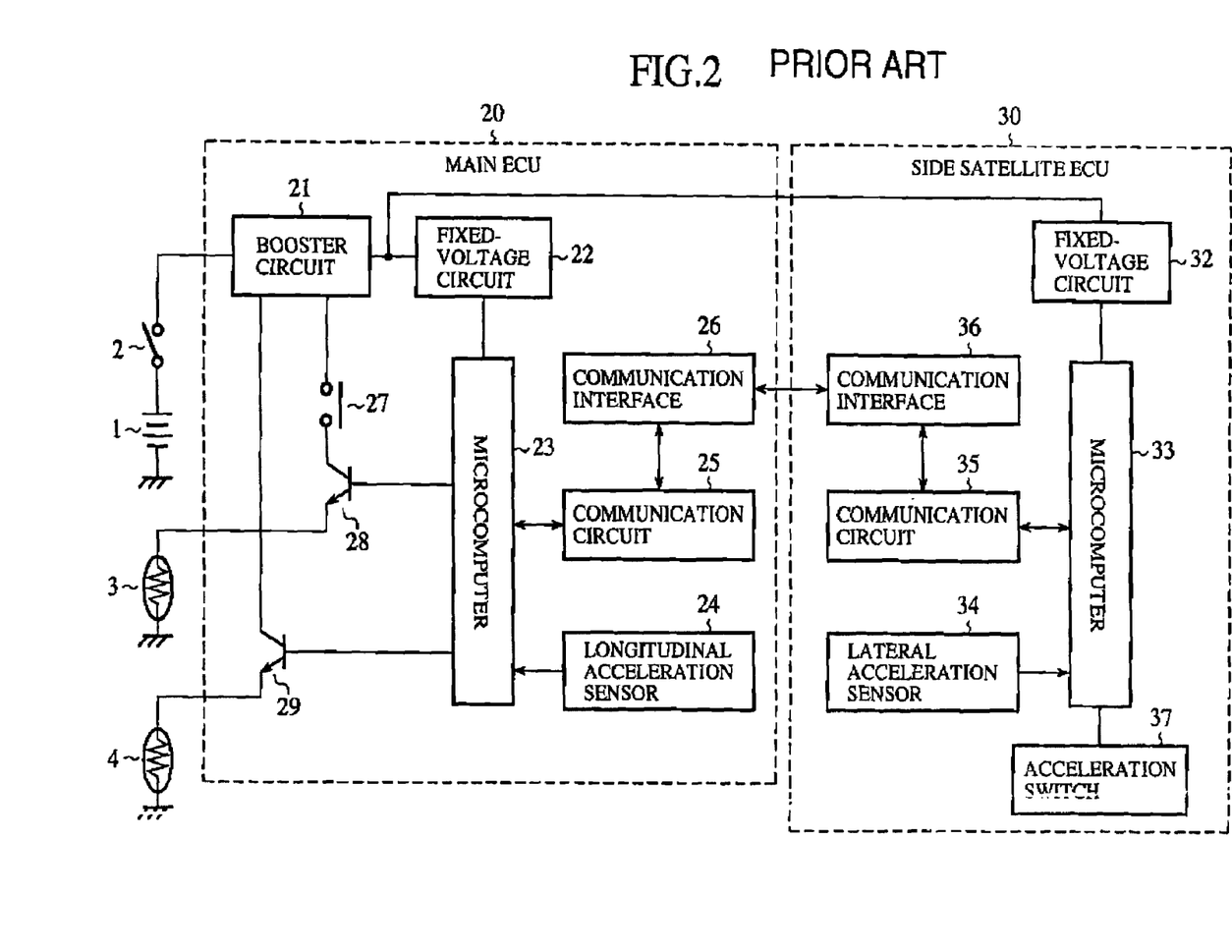
FIG. 2 is a block diagram showing the circuit configuration of the conventional communication system.

FIG. 2 is a block diagram showing the schematic circuit configuration for implementing the conventional communication system. In this figure, the required minimum main ECU 20 and satellite ECU 30 in a pair are shown for simplicity.

In the figure, 1 is the battery of the vehicle, by which a d.c. current is supplied to the booster circuit 21 of the main ECU 20 via an ignition switch 2. 3 and 4 are squib resistances for igniting the gun powder for unfolding the air bags (not shown) for protecting the front portion and the side portion of an occupant. If a collision occurs at the front side of the vehicle, an ignition current is supplied to the squib resistance 3 from the booster circuit 21 through a mechanical acceleration switch 27, which closes when it senses an impact in the longitudinal direction of the vehicle, and a switching transistor 28 controlled by a microcomputer 23. To the other squib resistance 4, an ignition current is also supplied from the booster circuit 21 through a switching transistor 29 controlled by the microcomputer 23 upon the occurrence of a side-impact collision to the vehicle. Further, from the booster circuit 21, a d.c. voltage is supplied to fixed-voltage circuits 22 and 32 functioning as the d.c. power supplies for the microcomputers 23 and 33 and other circuits.

Now, the operation is described.

The microcomputer 23 always determines faults of a longitudinal acceleration sensor 24 in the normal condition where there is no collision, and if a fault occurs, it outputs a signal for controlling an alarm (not shown) such as a lamp. If a collision at the front side of the vehicle occurs, the microcomputer 23 determines the detection signal from the longitudinal acceleration sensor 24, which represents a collision state, and outputs a control signal to bring the switching transistor 28 into conduction. At this point, if the mechanical acceleration switch 27 is closed, an ignition current is supplied to the squib resistance 3 to unfold the air bag in front of the occupant.

Further, the microcomputer 23 exchanges signals with a communication circuit 25. Based on a clock pulse, a trigger signal (a) of FIG. 3 of a fixed period is sent from the communication circuit 25 to the side satellite ECU 30 side through a communication interface 26. As described later, a signal (b) or (c) of FIG. 3 sent from the satellite ECU 30 in response to the trigger signal is provided to the microcomputer 23 through the communication interface 26 and the communication circuit 25.

Figure 3:
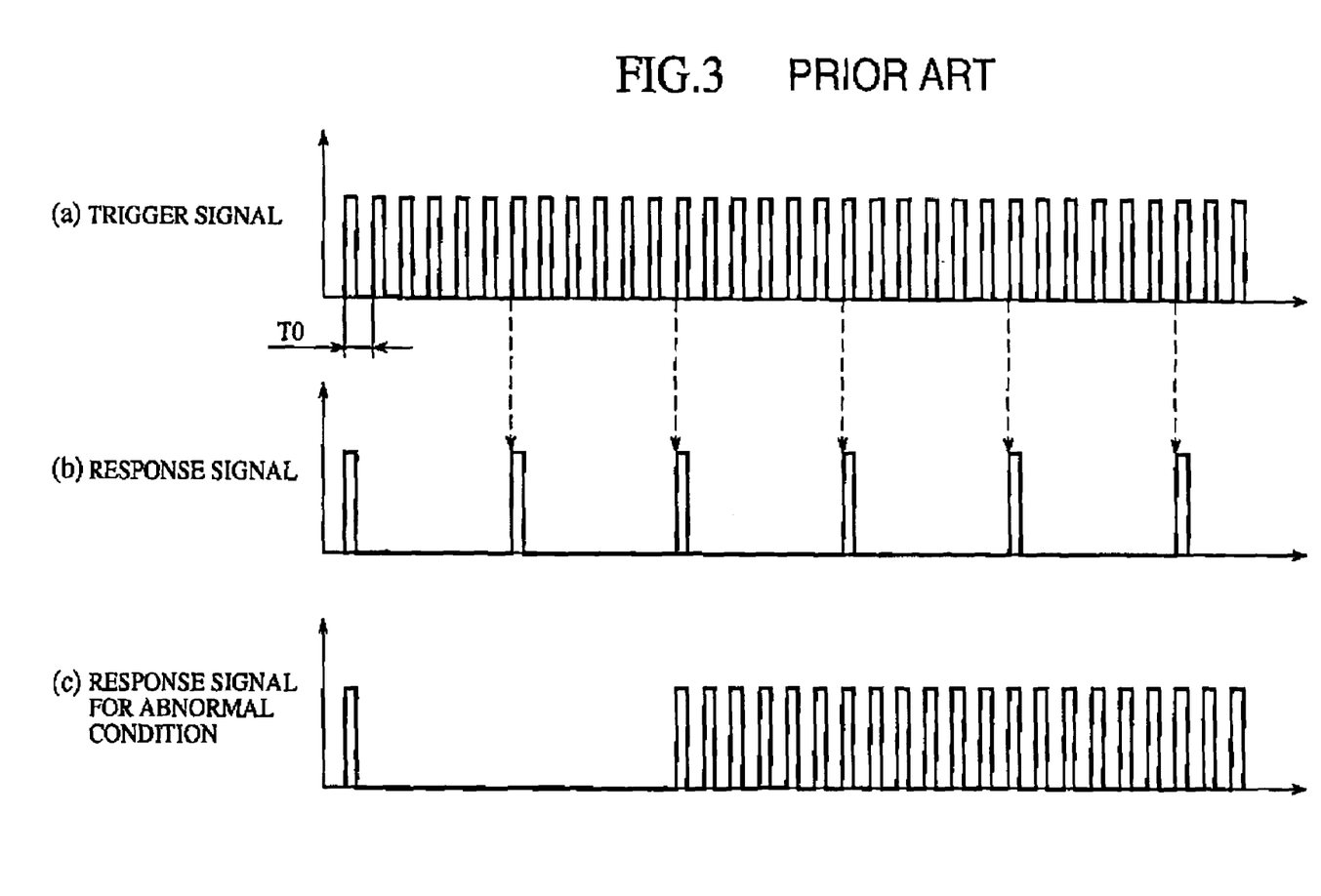
FIG. 3 is a signal diagram for explaining the conventional communication system.

In the satellite ECU 30, the microcomputer 33 performs the normal fault diagnosis of a lateral acceleration sensor 34 and an acceleration switch 37, and determines the detection outputs of the lateral acceleration sensor 34 and the acceleration switch 37, if a collision at its lateral side of the vehicle occurs. In the fault diagnosis, the signal (b) of FIG. 3 is sent to the main ECU 20 side via a communication circuit 35 and a communication interface 36, and if the microcomputer 23 determines that an abnormal state has occurred, the alarm is operated to alert the occupant to it. Further, in the event of a side-impact collision, determination is made in the microcomputer 33 upon receipt of the detection signals of the lateral acceleration sensor 34 and the acceleration switch 37, and the signal (c) of FIG. 3 indicating a collision is sent to the microcomputer 23 through the communication system. Upon receipt of this signal, the microcomputer 23 determines whether the collision has actually occurred, and outputs a control signal to turn on the switching transistor 29 if it determines that the collision is dangerous. Whereupon, an ignition current flows through the squib resistance 4 via the switching transistor 29 to unfold the air bag for side protection.

The conventional communication system is described according to FIG. 3. A trigger signal (a) of repetitive pulses with a fixed period TO is always sent from the main ECU 20 to the satellite ECU 30 side. On the other hand, a diagnosis data provided by checking the fault status of the lateral acceleration sensor 34 and the acceleration switch 37 are outputted from the microcomputer 33, and upon the reception of a predetermined number of pulses of the trigger signal (a), a response signal (b) including the diagnosis data is sent from the communication circuit 35 to the main ECU 20 side. The response signal (b) is provided to the microcomputer 23, which determines the diagnosis data, and issues a control output to drive the alarm if there is anything wrong. Further, if a lateral collision occurs with a vehicle, the response signal is as shown by (c).

Since the conventional communication system is constructed above, the main ECU requires a transmission process for always sending the trigger signal, and a data reception process for the response signal, so the processing is complicated. Furthermore, there is a problem that the satellite ECU requires a circuit for receiving the trigger, causing an obstacle to the downsizing of the device.

This invention was accomplished to solve the above described problem, and its object is to obtain a communication system in which the communication between the main ECU and the satellite ECU is carried out by the start-stop synchronization communication provided in the microcomputer.

DISCLOSURE OF THE INVENTION

The communication system related to this invention comprises a first microcomputer having a communication function for outputting a data signal having a data time Td and a transmission period Tp, which sends various data processed by itself and carried on the data signal, and a second microcomputer for receiving and sequentially storing data signals in a memory, and reading and processing the various data by timing pulses, and it is characterized in that the data time Td and the transmission period Tp have a relation of Td<Tp/2.

With this, the start-stop synchronization communication function provided in the microcomputer can be directly used to construct the device in a small size without requiring the trigger signal as in the prior art, and data reception can be automatically carried out, so there is an effect that the processing can be simplified. Further, the data time Td and the transmission period Tp are provided with the relation of Td<Tp/2, and thus, there is an effect that reception recovery can be made faster against a noise included during transmission.

The communication system related to this invention is characterized by theoretically having a relation of Tr=Tp between the transmission period Tp and the timing pulse period Tr.

This produces an effect that the data stored in the microcomputer on the receiving side can substantially be read out and processed.

The communication system related to this invention is characterized in that the relation between the transmission period Tp and the timing pulse period Tr is set in such a manner that at least a piece of data readable from the memory is included in a period between a timing pulse and the next timing pulse.

With this, a piece of data can always be read out and processed for each timing pulse, and there is an effect that the accuracy of the reading process can be increased.

The communication system related to this invention is characterized by theoretically having a relation of Tr=2Tp between the transmission period Tp and the timing pulse period T.

This produces an effect that the condition setting of the microcomputer can easily be made.

BEST MODE FOR CARRYING OUT THE INVENTION

Now, to describe this invention in more detail, the best embodiment of this invention is described according to the accompanying drawings.

First Embodiment

Figure 4:
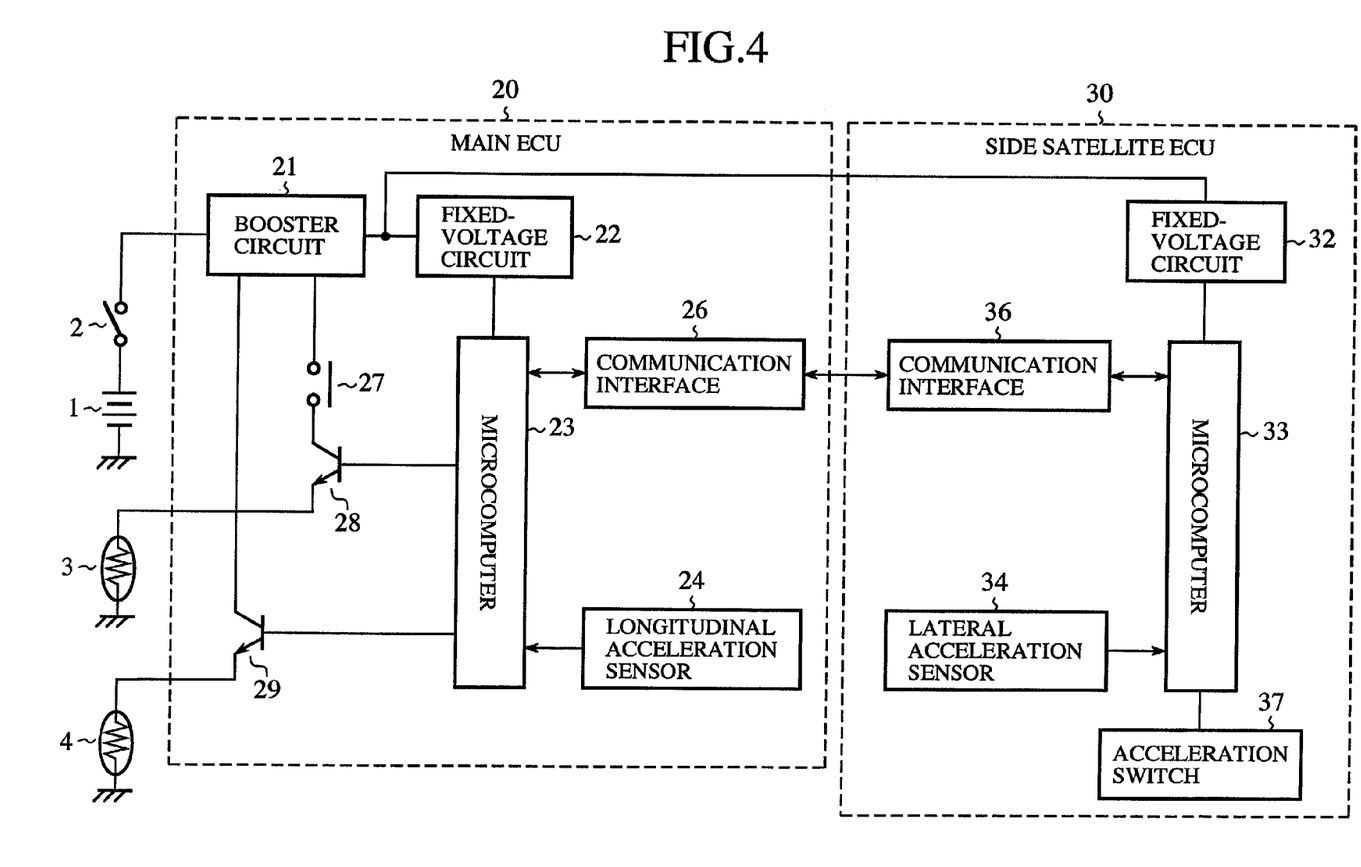
FIG. 4 is a block diagram showing the circuit configuration to which the communication system according to the embodiment of this invention is applied.

FIG. 4 is a block diagram showing the schematic circuit configuration to which the communication system according to a first embodiment of this invention is applied. This figure is different from FIG. 2 in the point that the communication circuits (25 and 35 in FIG. 2) are not respectively provided outside the microcomputers 23 and 33. Accordingly, the construction and operation are similar to the description of FIG. 2 except for the point that signals are exchanged in a different way because the communication system is different, so that duplicate description of it is omitted here.

The microcomputer generally has a data signal generation function of the start-stop synchronization communication. This data signal has a data time that repeats in a fixed cycle, as described later. In this embodiment, the start-stop synchronization communication function of the microcomputer is used.

In FIG. 4, the microcomputer first microcomputer) 33 outputs the fault diagnosis data on the lateral acceleration sensor 34 and the acceleration switch 37 as well as the determination data on a side-impact collision by carrying them on a data signal of the start-stop synchronization communication. The output signal is transmitted to the main ECU 20 via the communication interface 36. In the main ECU 20, the data signal is received through the communication interface 26 and provided to the microcomputer (second microcomputer) 23. In the microcomputer 23, the data contained in the received signal is sequentially read into the memory. This data is read by timing pulses for reading which have a predetermined period, and used to determine the collision diagnosis and collision status.

Figure 5:
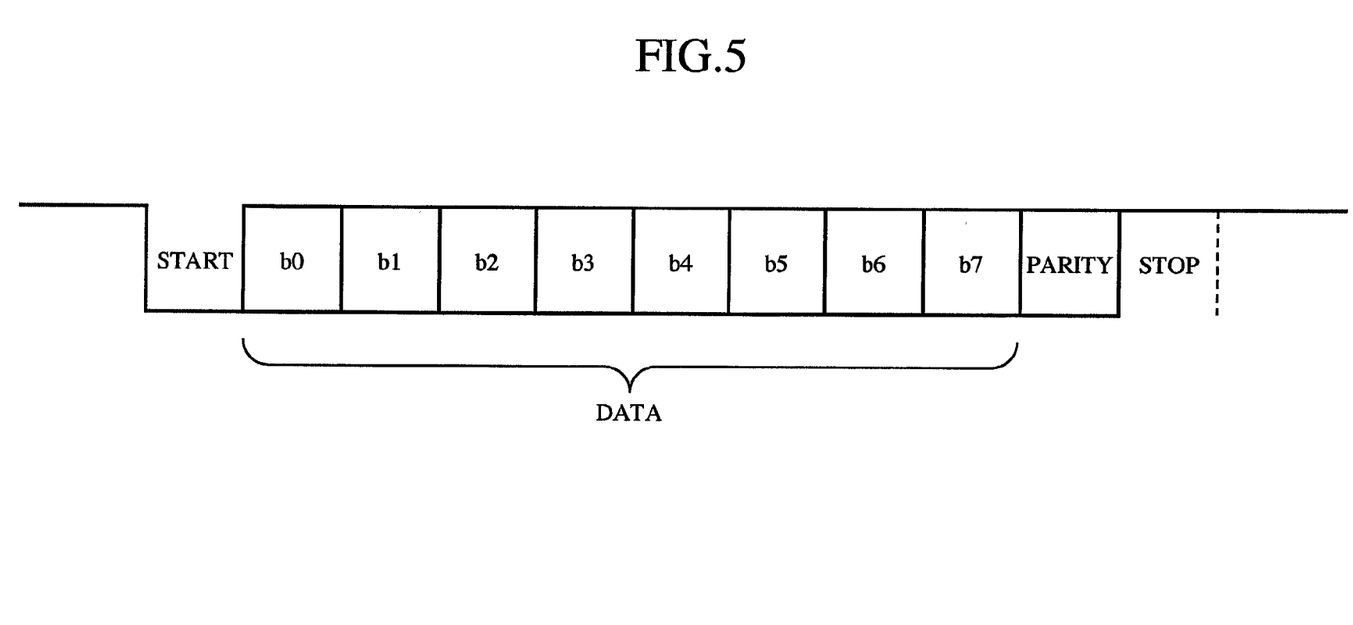
FIG. 5 is a signal diagram for explaining the start-stop synchronization communication used in the embodiment of this invention.

In FIG. 5, an example of the data frame of the data signal used in the start-stop synchronization communication is shown. Regarding the number of bits assigned, the start bit is assigned one bit, the data bits are assigned eight bits of b0 to b7, the parity is assigned one bit, and the stop bit is assigned one bit, which are constructed in this order. The fault diagnosis data, collision data, and other necessary data are represented by the data bits b0 to b7 of the signal. However, the number of data bits is not limited to eight, and it is determined by the microcomputer used.

Figure 6:
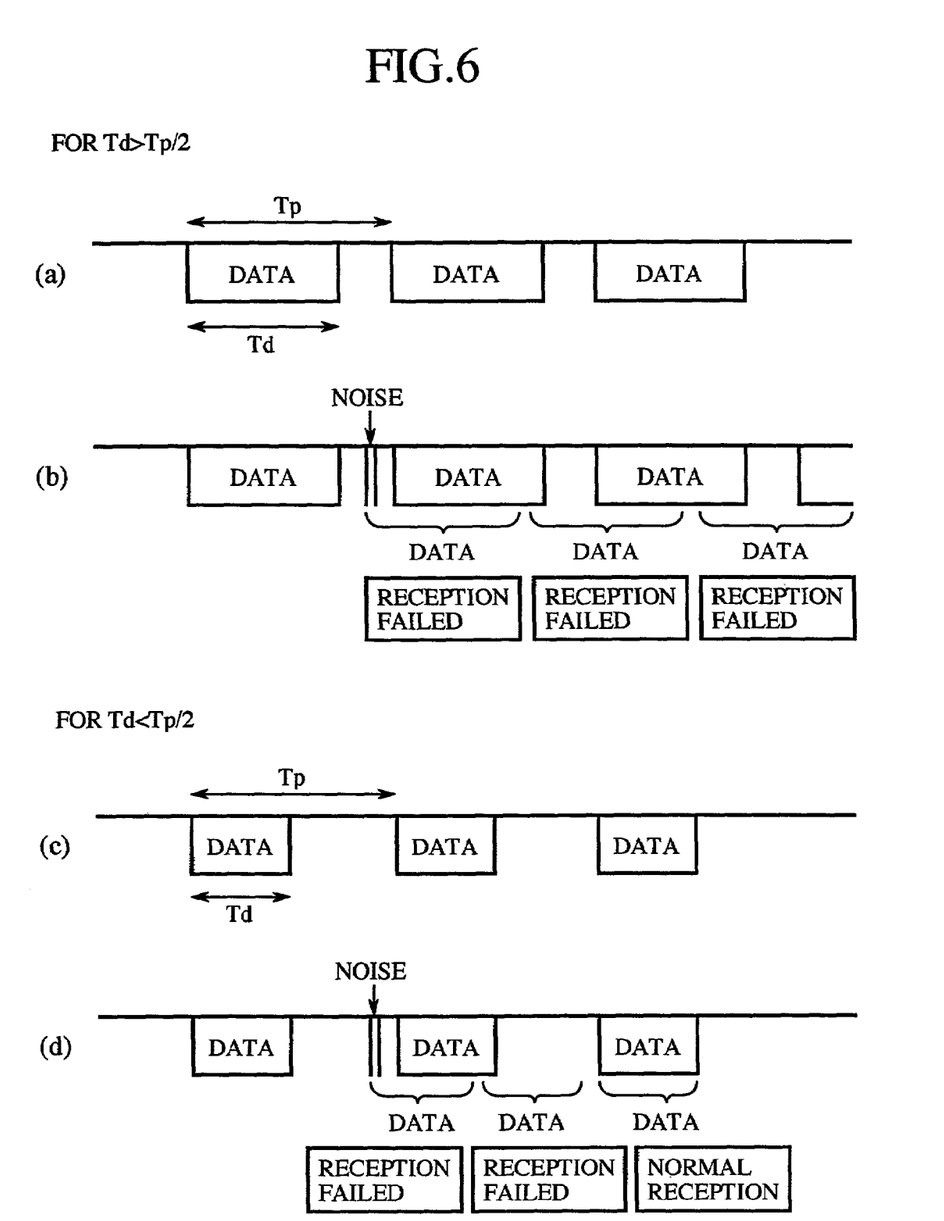
FIG. 6 is a signal diagram for explaining the communication system according to the embodiment of the present invention.

FIG. 6 shows the relation between the data transmission period Tp and the data time (time of data frame) Td of the signal used in the start-stop synchronization communication.

For the case of Td>Tp/2, the transmission data signal from the microcomputer 33 has a time allocation as shown in (a). A noise may be included in a non-data time band as shown in (b). If this occurred, the microcomputer 23 of the main ECU 20 would erroneously detect the noise as the start bit, and start to read data. Assuming that the data read time is the same as the original data time Td, if a data change from 1 to 0 occurred after the end of the reading, the microcomputer 23 would again erroneously detect it as the start bit to start the read operation. If this error operation is repeated, it takes time for the normal receive state to be recovered, and the recovery can be impossible under certain circumstances.

Thus, in the first embodiment, the data transmission period Tp and the data time Td are set so as to have a relation of Td<Tp/2 shown in FIG. 6 (c). By this, even if reading due to a wrong detection by the microcomputer 23 occurs when a noise is included, as shown in (d), the normal receive state can be recovered at least on around the third time.

When a data signal having the transmission period Tp as described above is received at the microcomputer 23, it is stored in the built-in memory of a predetermined capacity while being sequentially renewed. Each of the data accumulated in the memory is read out in response to timing pulses for reading which repeat with a predetermined period Tr, and subject to data processing. The relation between the timing pulse period Tr and the transmission period Tp is described according to the signal diagrams shown in FIGS. 7 and 8.

Figure 7:
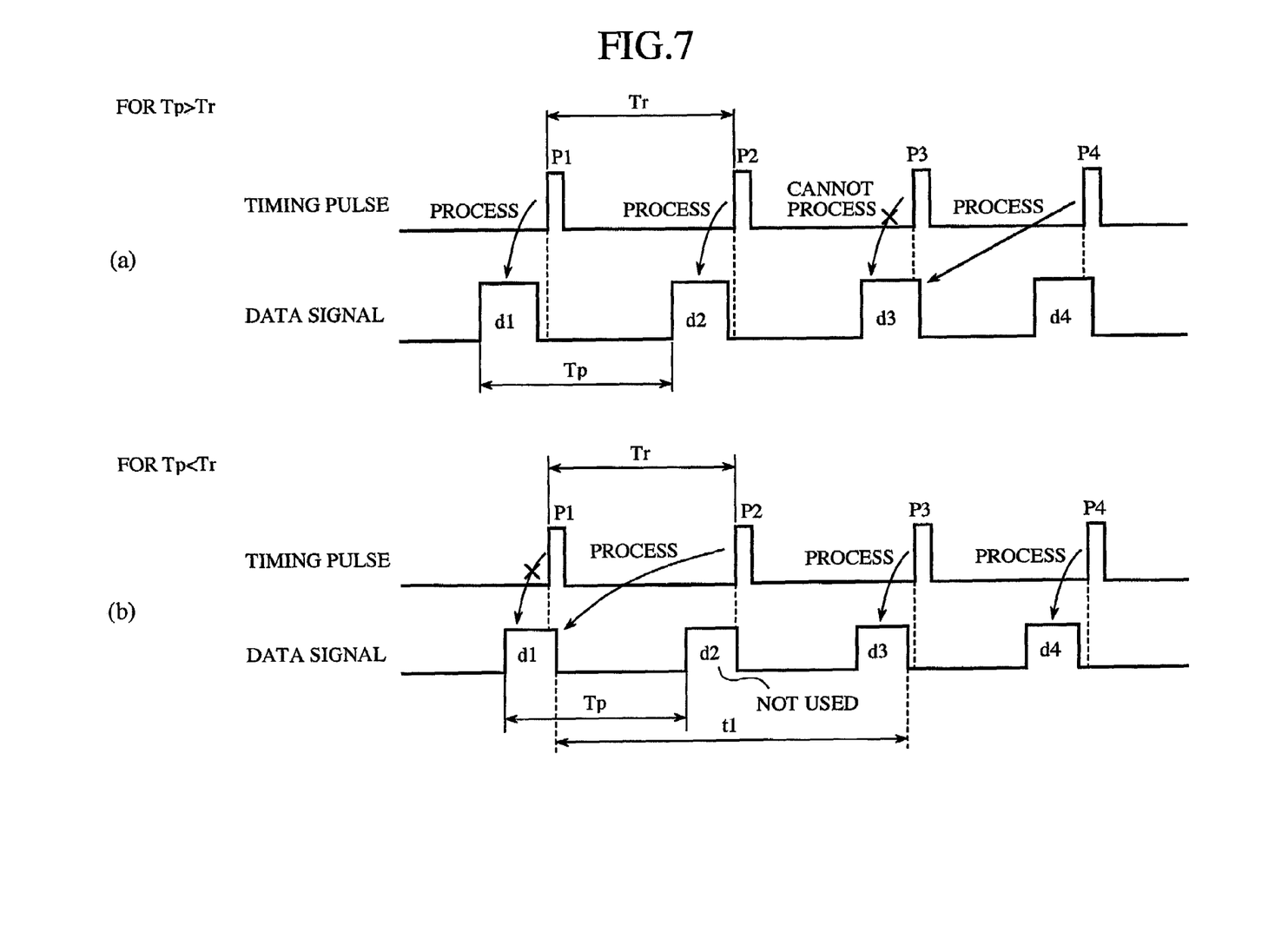
FIG. 7 is a signal diagram for explaining the signal processing method of the communication system according to the embodiment of this invention.

Assuming that the timing pulse period Tr is fixed, the transmission period Tp is set by the microcomputer 33. Both periods Tr and Tp are preferably set to the same value, but actually it is almost impossible to make them the same because of variations in the frequency of the oscillator to be used. Accordingly, the two periods Tr and Tp are somewhat different from each other, and have a relation of Tp>Tr as shown in f 7 (a) or Tp<Tr as shown in FIG. 7 (b).

For the case of Tp>Tr, the timing pulses p1 and p2 for reading can read respective data d1 and d2, but the timing pulse p3 cannot read data d3, because it has not completely been stored in the memory. Instead, it is the timing pulse p4 that reads the data d3, and the processing delays accordingly.

Further, for the case of Tp<Tr, the timing pulse p1 cannot read the data d1, which is read by the pulse p2. The data d2 is not used, because the pulse p2 has read the data d1 once. The next timing pulses p3 and p4 will read the data d3 and d4 in sequence. Thus, time t1 is generated where reading and data processing are not performed.

Figure 8:
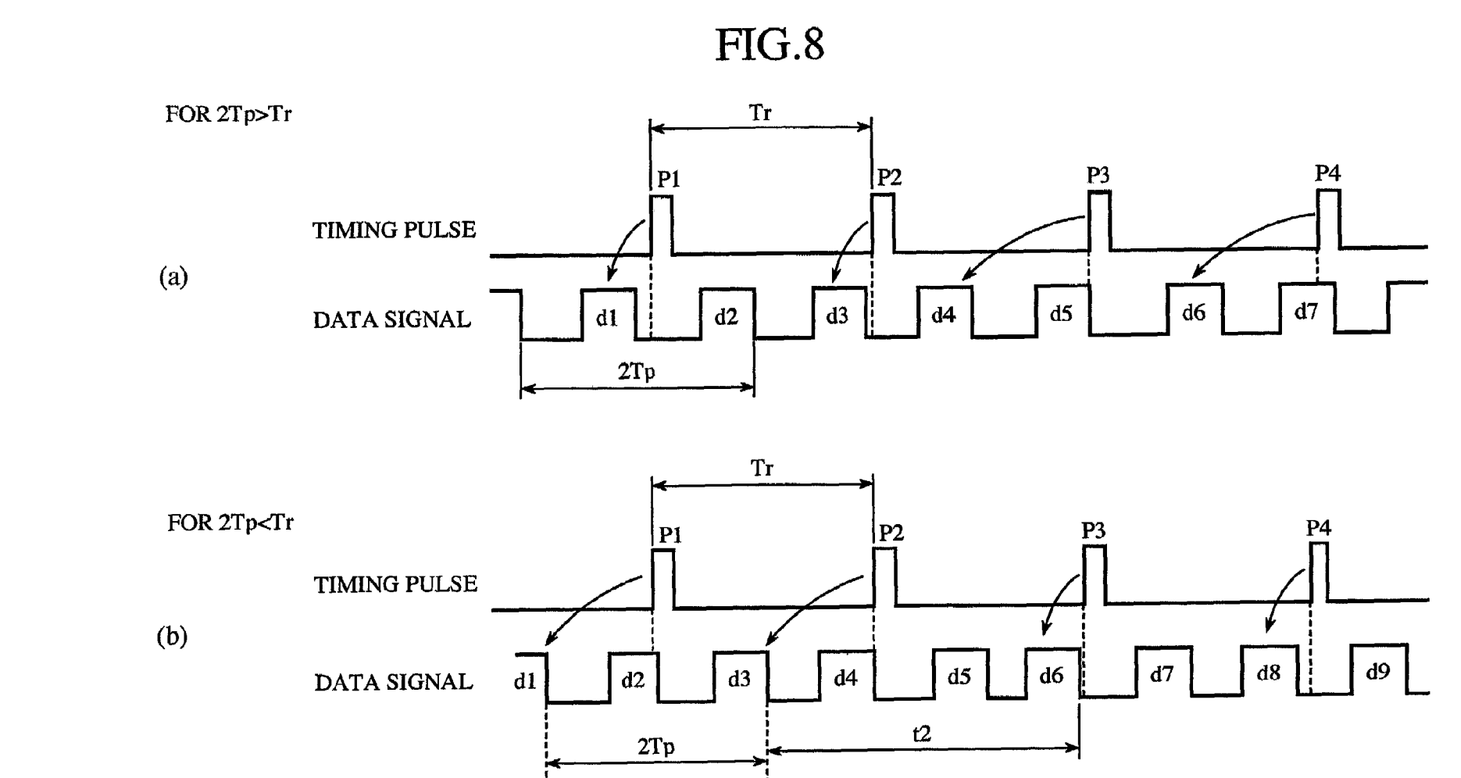
FIG. 8 is a signal diagram for explaining another signal processing method of the communication system according to the embodiment of this invention.

As described above, by theoretically setting the timing pulse period Tr and the transmission period Tp to the same value, though they actually differ from each other, the determination function of the microcomputer 23 can effectively be achieved. However, to further increase the accuracy of it, and to take into consideration the construction of a simple circuit, the data transmission period Tp is preferably theoretically set ½ times the timing pulse period Tr. In this case, the relation between the two also actually fluctuates a little, and it becomes 2Tp>Tr as shown in FIG. 8 (a) or 2Tp<Tr as shown in FIG. 8 (b).

For the case of 2Tp>Tr, the timing pulses p1, p2, p3, and p4 read and process the data d1, d3, d4, and d6 existing between the respective pulses. The timing pulse can read out and process any data without fail.

Further, for the case of 2Tp<Tr, the timing pulses p1, p2, p3, and p4 also read and process the data d1, d3, d6, and d8 existing between the respective pulses without fail. The latest data is read and processed. Further, even if a time t2 occurs in which no data is read and processed, it is shorter than the time t1 in FIG. 7 (b).

As described above, in accordance with the first embodiment, since fault diagnosis and collision data are directly transmitted to the microcomputer 23 of the main ECU 20 by using the data signal for start-stop synchronization communication provided in the microcomputer 33 of the satellite ECU 30, and processed by using the processing function of the start-stop synchronization communication, no trigger signal is required, so the device can be made small-sized without providing any specific transmitter-receiver circuit, and the processing becomes simple because data reception is automatically carried out.

Further, in accordance with the first embodiment, the data time Td and the transmission period Tp of the data signal are set in such a relation of Td<Tp/2, and thus, the time taken for the detection operation to recover the normal reception on the receiving side can be shortened even if a noise is included.

Further, in accordance with the first embodiment, by setting the condition between the transmission period Tp of the data signal and the read timing pulse period Tp of the microcomputer 23 of the main ECU 20, the processing accuracy can be increased. In particular, if the relation between the transmission period Tp and the timing pulse period Tr is established such that at least one piece of data readable from the memory is included between a timing pulse and the next timing pulse, the processing is made effective. Specifically, to enable easy setting on the condition setting of the microcomputer and reduce as much as possible the data that is not read, the relation of 2Tp=Tr is preferable.

INDUSTRIAL APPLICABILITY

As described above, the communication system related to this invention enables the actual circuit assembly to be made simple by using the communication function normally provided to the microcomputer, namely the start-stop synchronization communication function, and thus, it contributes to downsizing the circuit and maintenance can easily be carried out. Accordingly, it is desired that the system is put in a practical use with the vehicular occupant protecting device, which has increasingly been permanently provided in recent years.

The invention claimed is:

1. A communication system comprising:
a first microcomputer having a communication function for outputting a data signal including data frames, each including a plurality of data bits and having a data time Td and a transmission period Tp; and
a second microcomputer for receiving said data signal, sequentially storing said data frames in a memory, and reading and processing said data frames by timing pulses, wherein said data time Td and said transmission period Tp have a relation of Td<Tp/2, and the transmission period Tp is substantially equal to Tr/2, where Tr is a timing pulse period of the timing pulses.

2. The communication system according to claim 1, wherein the relation between the transmission period Tp and the timing pulse period Tr of the timing pulses is set in such a manner that at least a piece of data readable from the memory is included in a period between a timing pulse and a next timing pulse.

\* \* \* \* \*